United States Patent
Vodermayer

(10) Patent No.: US 6,854,385 B1
(45) Date of Patent: Feb. 15, 2005

(54) ELASTIC ROLL FOR SMOOTHING PAPER WEBS

(75) Inventor: Albert Maria Vodermayer, Dietlikon (CH)

(73) Assignee: Die Voith Sulzer Papiertechnik Patent GmbH, Heidenheim (DE)

( * ) Notice: Subject to any disclaimer, the term of this patent is extended or adjusted under 35 U.S.C. 154(b) by 558 days.

(21) Appl. No.: 09/598,907

(22) Filed: Jun. 22, 2000

(30) Foreign Application Priority Data

Jun. 23, 1999 (DE) .......................... 199 28 755

(51) Int. Cl.[7] .............................................. B30B 15/34
(52) U.S. Cl. .................... 100/155 R; 100/160; 100/334
(58) Field of Search ................ 492/49, 56; 100/155 R, 100/160, 176, 47, 334, 335, 336

(56) References Cited

U.S. PATENT DOCUMENTS

| | | | | |
|---|---|---|---|---|
| 5,387,172 A | * | 2/1995 | Habenicht et al. | 492/56 |
| 5,419,242 A | * | 5/1995 | van Haag | 100/47 |
| 5,655,444 A | * | 8/1997 | Kayser et al. | 100/155 R |
| 5,769,771 A | * | 6/1998 | van Haag | 492/56 |
| 5,775,211 A | * | 7/1998 | Brendel | 100/47 |
| 5,813,959 A | * | 9/1998 | Hader et al. | 492/56 |
| 5,887,517 A | * | 3/1999 | Liang et al. | 100/155 R |
| 5,932,069 A | * | 8/1999 | Kuosa et al. | 100/334 |
| 6,171,223 B1 | * | 1/2001 | Koivukunnas et al. | 492/56 |
| 6,253,671 B1 | * | 7/2001 | Kayser | 100/155 R |
| 6,315,704 B1 | * | 11/2001 | Sohl | 492/56 |

FOREIGN PATENT DOCUMENTS

| | | |
|---|---|---|
| DE | 3029288 | 7/1984 |
| DE | 3725742 | 3/1988 |
| DE | 3937246 | 5/1990 |
| DE | 3751815 | 1/1997 |
| DE | 29722778 | 5/1998 |

OTHER PUBLICATIONS

Gamsjäger, N., "Elastische Kalanderwalzenbezüge auf Basis Faser–Kunststoff–verbund", *Das Papier*, H.6, 1994, pp. 334–336, 338, 343, 344, 347, and 348.

* cited by examiner

*Primary Examiner*—Louis Huynh
(74) *Attorney, Agent, or Firm*—Greenblum & Bernstein, P.L.C.

(57) ABSTRACT

Roll for smoothing paper webs including a hard roll core and an elastic covering layer provided on an outside of the core. The elastic covering includes an elastic matrix material, and is structured to operate within a temperature range between approximately 25° C. and 150° C. The elastic covering is further structured to operate with a nip frequency of between about 0.3 Hz and 5 Hz, and to be regionally compressible and to operate with a surface compression amplitude of between about 15 µm and 50 µm. The covering is further structured for a total dissipated energy of less than approximately 0.9J/cm³.

25 Claims, 1 Drawing Sheet

FIGURE
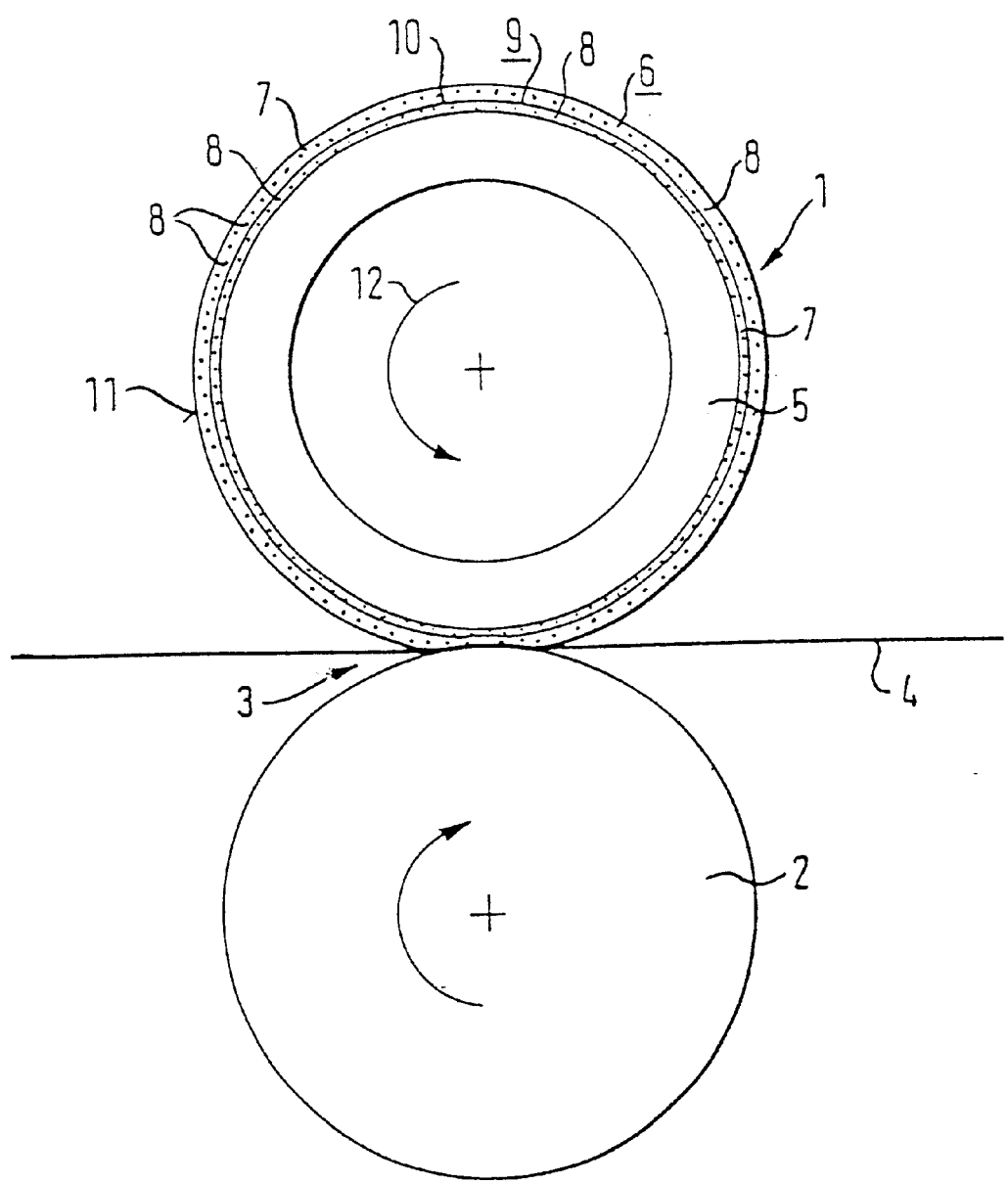

ELASTIC ROLL FOR SMOOTHING PAPER WEBS

CROSS-REFERENCE TO RELATED APPLICATIONS

The present application claims priority under 35 U.S.C. § 119 of German Patent Application No. 199 28 755.4 filed on Jun. 23, 1999, the disclosure of which is expressly incorporated by reference herein in its entirety.

BACKGROUND OF THE INVENTION

1. Field of the Invention

The present invention relates to a roll for the smoothing of paper webs, having a hard roll core constructed of metal and having an elastic covering layer provided on the outside of the roll. The covering layer is an elastic matrix material, which is regionally compressible in operation with the roll rotating, for example, by a counter-roll which can be pressed on the roll.

2. Discussion of Background Information

Elastic rolls of this kind are used, for example, in the satining of paper webs. In such a case, one elastic roll forms, together with a hard roll, a press gap through which the paper web to be treated is guided. While the hard roll has a very smooth surface constructed of, for example, steel or chilled cast iron and is responsible for the smoothing of the side of the paper web facing it, the elastic roll acting on the opposite side of the paper web effects homogenizing and compacting of the paper web in the nip. The size of the roll can range from lengths of about 3 m to 12 m and can have a diameter ranging from about 450 mm to 1500 mm. The roll can withstand line forces of up to about 600 N/mm and compressive stresses of up to about 130 N/mm$^2$.

As the trend in paper manufacturing is progressing towards performing satining in an online operation (i.e. towards guiding the paper web exiting the paper machine or coating machine directly through the paper smoothing apparatus/calender), higher demands than previously are made on the rolls of the smoothing apparatus, particularly with regard to temperature resistance. As a result of the high transportation speeds of the paper web required in online operation and the high rotation speeds of the calender rolls associated with this operation, its nip frequency, that is the frequency with which the covering is compressed and relieved of its load again, is increased. This in turn, leads to increased roll temperatures. These high temperatures arising during online operation lead to problems which can eventually lead to the destruction of the plastic coatings in known elastic rolls. On the one hand, with known plastic coatings, maximum temperature differences of around 20° C. are permissible over the width of the roll and, on the other hand, the plastics conventionally used for the coating have a substantially higher coefficient of thermal expansion than the conventionally used steel rolls or chilled cast-iron rolls so that due to an increase in temperature, high axial stresses occur between the steel roll or the chilled cast-iron roll and the plastic coating associated with it.

So-called hot spots, at which a peeling or even a breaking open of the plastic layer occurs, arise due to these high stresses in conjunction with hot regions occurring particularly in spot form. These hot spots occur, in particular, when in addition to the mechanical stresses and the relatively high temperature, crystallization spots exist in the form of, for example, defective adhesive bonds, deposits or above-average recesses in the elastic coating (i.e. due to creases or foreign bodies on the paper web). In these cases, the temperature of the crystallization spots can increase from the normal range 80° C. to 90° C. to more than 150° C., during which the aforementioned destruction of the plastic layer occurs.

SUMMARY OF THE INVENTION

The present invention provides a roll that reduces the risk of the occurrence of hot spots.

The material and/or the structure of the elastic covering layer is selected, so that in operation with a temperature of the covering layer of between about 25° C. and 150° C., with a nip frequency (i.e. that is the frequency at which the covering layer is compressed and relieved of its load again) of between about 0.3 Hz and 5 Hz and with an amplitude of the surface of the elastic covering layer caused by the compression of between about 15 µm and 50 µm, the total dissipated energy of the covering layer is less than about 0.9 J/cm$^3$, in particular less than about 0.6 J/cm$^3$ and preferably less than about 0.3 J/cm$^3$.

In accordance with the invention, the creation of hot spots and resulting destruction of the covering layer is thus reduced by a minimization of the dissipation energy occurring in such an operation. The material and/or structure of the elastic covering layer are preferably selected so that the values of dissipated energy given are reached at a nip frequency of between about 0.5 Hz and 3 Hz, in particular at approximately 1Hz and/or at an amplitude of between about 20 µm and 40 µm, and preferably at approximately 30 µm.

Due to the minimization of the dissipation energy occurring in the elastic covering layer, a situation is achieved with the operating values given, in which no critical temperature values occur within the covering layer. Thus, the risk of hot spots occurring is thereby largely eliminated.

In accordance with an advantageous embodiment of the invention, a corresponding matrix material having low energy dissipation, in particular, a suitable resin/hardener combination, is used as the matrix material to achieve the given values of the dissipated energy. A highly elastic resin can preferably be used as the resin.

Since matrix materials commonly used for the creation of the elastic covering layer have relatively high energy dissipation due to their visco-elastic behavior, in accordance with a preferred embodiment of the invention, filling materials having low energy dissipation, in particular fibers and/or powdery filling materials, are embedded in the matrix material to achieve the values of dissipated energy given. Mineral filling materials are preferably used for this as they have particularly low energy dissipation.

The fibers are preferably designed as glass and/or carbon fibers to give the elastic covering layer the required rigidity. Thus, fibers can be disposed in one or more fiber layers within the matrix material of the elastic covering layer.

According to an embodiment of the present invention, a roll for smoothing paper webs is provided, which includes a hard roll core and an elastic covering layer provided on the outside of the core. The elastic covering includes an elastic matrix material, and the cover is structured to operate within a temperature range between approximately 25° C. and 150° C. The elastic cover is further structured to operate with a nip frequency of between about 0.3 Hz and 5 Hz, and to be regionally compressible and to operate with a surface compression amplitude of between about 15 µm and 50 µm. The cover is further structured for a total dissipated energy of less than approximately 0.9 J/cm$^3$.

According to another aspect of the present invention, a roll is provided wherein the total dissipated energy of the covering layer is less than about 0.6 J/cm$^3$. In another aspect of the invention, a roll is provided wherein the total dissipated energy of the covering layer is less than about 0.3 J/cm$^3$.

According to a further aspect of the present invention, roll is provided wherein the dissipated energy range is achieved when the nip frequency is between about 0.5 Hz and 3 Hz. According to still a further aspect of the present invention, a roll is provided wherein the dissipated energy range is achieved when said nip frequency is about 1 Hz.

Further aspects of the invention include a roll wherein the dissipated energy range is achieved when the surface compression amplitude is between about 20 and 40 μm. According to other aspects of the present invention, a roll is provided wherein the dissipated energy range is achieved when the surface compression amplitude is about 30 μm.

Other aspects of the present invention include a roll wherein the elastic covering includes a matrix material having low energy dissipation, such that the matrix material provides the dissipated energy range for the elastic covering.

Further aspects of the present invention include a roll wherein the matrix material includes a resin/hardener combination wherein the resin comprises a highly elastic resin.

According to a further aspect of the invention, a roll is provided wherein the matrix material comprises a plastic, including a thermosetting plastic, or thermoplastic.

According to another aspect of the invention, a roll is provided wherein the elastic covering includes a matrix material and filling materials having low energy dissipation embedded in the matrix material, dissipated energy range for the elastic cover.

In another aspect of the invention, a roll is provided wherein the hard roll is constructed from metal.

According to a further aspect of the invention, a roll is provided wherein the filling materials including either a fibers and/or powdery filling materials, such as mineral filling materials.

According to other aspects of the invention, a roll is provided having fibers including glass fiber and/or carbon fiber. Further aspects of the invention includes a roll having fibers that are arranged into at least one fiber layer embedded in the matrix material.

According to another aspect of the present invention, an apparatus for smoothing a material web, is provided including a first roll having a hard roll; an elastic covering arranged on the hard roll core; a second roll arranged as a counter roll, wherein the first and second rolls are arranged to form a press nip and the elastic cover is regionally compressible in the press nip; and the elastic cover is structured to dissipate a total amount of energy less than about 0.9 J/cm$^3$.

According to still a further aspect of the invention, an apparatus is provided wherein during operation, the elastic cover has a temperature within a range of approximately 25° C. and 150° C., and a nip frequency in the press nip is between approximately 0.3 Hz and 5 Hz.

According to an aspect of the invention, an apparatus is provided wherein the elastic cover is regionally compressible to an amplitude of about 15 μm and 50 μm.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted drawing by way of non-limiting examples of exemplary embodiments of the present invention, in which like reference numerals represent similar parts throughout the drawing, and wherein:

The FIGURE illustrates a cross-sectional view of an elastic roll for smoothing paper webs, according to an aspect of the present invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The invention is described in more detail below by means of one embodiment with reference to the FIGURE. The FIGURE shows a schematic cross-section through an elastic roll 1 formed in accordance with the invention which together with a hard roll 2 forms a press gap 3 through which a web of material, for example a paper web 4 is guided. The elastic roll 1 includes a roll core 5 made of, for example, steel or chilled cast iron, the outside of which is provided with an elastic covering layer 6.

The elastic covering layer 6 includes an elastic matrix material 7 into which the filling materials 8 and fibers 10 arranged in fiber layers 9 are embedded, with only one fiber layer 9 being shown in the FIGURE for reasons of illustration. Commonly, not just one, but a plurality, for example 10 to 40 fiber layers 9, are embedded in the matrix material 7. These can be created, for example, by winding fiber bundles or fiber rovings onto roll core 1, with the fiber bundles or fiber rovings being able to be drawn through a matrix bath, prior to the winding onto the roll core 1.

As can be seen from the FIGURE, the elastic covering layer 6 is compressed in the press gap 3 by the hard roll 2 so that the surface 11 of the elastic covering layer 6 is periodically pressed in over its circumference in press gap 3 when the elastic roll 1 rotates in the direction of the arrow 12.

In accordance with the invention, the material and/or the structure of the elastic covering layer 6 are selected so that with a nip frequency (i.e. the frequency at which the covering layer is compressed and relieved of its load again) of between about 0.3 Hz and 5 Hz and with an amplitude of the surface of the elastic covering layer 6 caused by the compression of between about 15 μm and 50 μm, the total dissipated energy of the covering layer 6 is preferably less than about 0.3 J/cm$^3$. This is achieved by the measures given in the claims and the description.

Due to the minimization of the dissipation energy in accordance with the invention, the risk of overheating the elastic covering layer 6 in operation is thus considerably reduced so that the risk of hot spots occurring is also reduced.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. An apparatus for smoothing a material web, comprising:
   a first roll comprising a hard roll core;
   an elastic covering arranged on said hard roll core;
   a second roll arranged as a counter roll, wherein said first and second rolls are arranged to form a press nip and said elastic cover is regionally compressible in said press nip; and
   said elastic covering is structured to dissipate, during operation, a total amount of energy less than about 0.9 J/cm$^3$.

2. The apparatus according to claim 1, wherein the total dissipated energy of the covering layer is less than about 0.6 J/cm$^3$.

3. The apparatus according to claim 2, wherein the total dissipated energy of the elastic covering is less than about 0.3 J/cm$^3$.

4. The apparatus according to claim 1, wherein said elastic covering is structured to dissipate the total dissipated energy at a nip frequency between about 0.5 Hz and 3 Hz.

5. The apparatus according to claim 4, wherein said nip frequency is about 1 Hz.

6. The apparatus according to claim 1, wherein said elastic covering is regionally compressible with a surface compression amplitude between 20 and 40 μm.

7. The apparatus according to claim 6, wherein said surface compression amplitude is about 30 μm.

8. The apparatus according to claim 1, wherein said elastic covering comprises a matrix material having low energy dissipation, such that said matrix material provides the dissipated energy range for said elastic covering.

9. The apparatus according to claim 8, wherein said matrix material comprises a resin/hardener combination.

10. The apparatus according to claim 9, wherein said resin comprises a highly elastic resin.

11. The apparatus according to claim 1, wherein said matrix material comprises a plastic.

12. The apparatus according claim 11, wherein said matrix material comprises a thermosetting plastic.

13. The apparatus according claim 11, wherein said matrix material comprises a thermoplastic.

14. The apparatus according to claim 1, said elastic covering comprising a matrix material and filling materials having low energy dissipation and said filling materials being embedded in said matrix material, whereby the dissipated energy range for said elastic covering is dependent on said matrix material and said filling materials.

15. The apparatus according to claim 14, wherein said filling materials comprises at least one of fibers and powdery filling materials.

16. The apparatus according to claim 15, wherein said fibers comprises at least one of glass fiber and carbon fiber.

17. The apparatus according to claim 15, wherein said fibers are arranged into at least one fiber layer embedded in said matrix material.

18. The apparatus according to claim 14, wherein said filling materials comprises mineral filling materials.

19. The apparatus according to claim 1, wherein said hard roll comprises metal.

20. The apparatus of claim 1, wherein during operation, said elastic covering has a temperature within a range of approximately 25° C. and 150° C., and a nip frequency in said press nip is between approximately 0.3 Hz and 5 Hz.

21. The apparatus of claim 1, wherein said elastic cover is regionally compressible to an amplitude of about 15 μm and 50 μm.

22. The apparatus according to claim 1, wherein said elastic covering is structured so that, with a nip frequency in said press nip between approximately 0.3 Hz and 5 Hz, a total amount of energy less than about 0.3 J/cm$^3$ is dissipated.

23. The apparatus according to claim 1, wherein said elastic covering is structured so that, with a nip frequency in said press nip between approximately 0.3 Hz and 5 Hz and a compression amplitude of between about 15 μm and 50 μm, a total amount of energy less than about 0.3 J/cm$^3$ is dissipated.

24. The apparatus according to claim 1, wherein said elastic covering is structured so that, with a compression amplitude of between about 15 μm and 50 μm, a total amount of energy less than about 0.3 J/cm$^3$ is dissipated.

25. An apparatus for smoothing a material web, comprising:
   a hard roll core;
   an elastic covering layer provided on an outside of said hard roll core, said elastic covering comprising an elastic matrix material and being regionally compressible, and
   for a temperature range between approximately 25° C. and 150° C., a nip frequency between about 0.3 Hz and 5 Hz, and a surface compression amplitude between about 15 μm and 50 μm, said elastic covering is structured for a total dissipation of energy of less than approximately 0.9 J/cm$^3$.

* * * * *

UNITED STATES PATENT AND TRADEMARK OFFICE
CERTIFICATE OF CORRECTION

PATENT NO. : 6,854,385 B1
DATED : February 15, 2005
INVENTOR(S) : A.M. Vodermayer It is certified that error appears in the above-identified patent and that said Letters Patent is hereby corrected as shown below:

Title page,
Item [73], Assignee, before "Voith" delete "Die".

Signed and Sealed this

Twenty-eighth Day of June, 2005

JON W. DUDAS
*Director of the United States Patent and Trademark Office*